March 18, 1969  P. S. MONROE  3,432,905
METHOD OF FABRICATING HEAT TRANSFER TUBING
Filed July 6, 1964                                                Sheet 1 of 2

INVENTOR
PAUL S. MONROE
BY Bert J. Lewen
ATTORNEY

March 18, 1969  P. S. MONROE  3,432,905
METHOD OF FABRICATING HEAT TRANSFER TUBING
Filed July 6, 1964  Sheet 2 of 2

INVENTOR
PAUL S. MONROE

BY Bert J. Lewen
ATTORNEY

United States Patent Office 3,432,905
Patented Mar. 18, 1969

3,432,905
METHOD OF FABRICATING HEAT
TRANSFER TUBING
Paul S. Monroe, Chatham, N.J., assignor to Halcon International, Inc., a corporation of Delaware
Filed July 6, 1964, Ser. No. 380,483
U.S. Cl. 29—157.3                                    6 Claims
Int. Cl. B21d 53/00; B23p 15/26

ABSTRACT OF THE DISCLOSURE

This invention relates to an improved means for joining flat plates to the external surface of thin wall tubing by introducing a fluid into a tube and freezing part of the assembly while the tube is surrounded with closely fitting tube sheets.

---

This invention relates to a new and improved means for joining flat plates to the external surface of thin-walled tubing. More specifically, the instant invention is concerned with integrally uniting a thin-walled tube to a substantially perpendicular sheet.

In a large variety of commercial equipment used in mechanical and chemical processing applications, it is necessary to provide a large amount of additional surface area to facilitate heat transfer. To increase this surface area, it is a common practice to extend the surface of the tubes by one or more means, such as wrapping thin metal at right angles to the tube, welding studs or vertical fins parallel to the tubes and machining grooves in the tubes. This apparatus is particularly useful in condensers, heat exchangers and radiators. In the case of a condenser, a cool fluid is circulated through a tube, and hot gases pass in contact with the fins and the external surface of the tube. In the radiator application, common in many homes as well as in commercial installations, a hot fluid is passed through the tube in order to heat the air surrounding the tube.

In another application of the invention, a method is proposed for uniting a plurality of tubes to one or more sheets, commonly called tube sheets. This operation is necessary in the manufacture of heat exchangers and chemical reactors as is well known in the art.

In the prior art, the tubes and sheets were joined by a series of expensive operations. In addition to being costly and time consuming, the attention of a skilled operator for a long period is required. The cumbersome nature of the welding requirements can be fully understood when it is realized that fin tubes are generally spaced as closely as 1¼" apart and heat exchangers have as many as 8000 tubes joined to at least two tube sheets.

In accordance with this invention, tubes and tube sheets can be united by applying the expansive forces exerted by a freezing fluid. More specifically, by introducing a liquid such as water, into a tube and then freezing part of the assembly, while the tube is surrounded with closely fitting tube sheets, a firm bond can be formed between the tube and the sheets.

The expansive forces of the freezing fluid causes a uniform enlargement of the external diameter of the tube which serves to form a rigid mechanical union. Also, uniform expansive force on all tubes at the same time avoids damaging the tube sheet.

The terms "fin" and "tube sheet," as used herein, while they have specific meanings in the reactor and heat exchanger arts, are intended to be used in their broadest sense. Specifically, a "tube sheet" is a heavy metal plate which serves to support a plurality of perpendicular aligned tubes. "Fins," on the other hand, are composed of a light gauge metal disposed parallel to each other along the surface of a tube.

The fins may be any shape whatever, e.g. rectangular or circular. Additionally, a continuous helical fin may replace a plurality of separate fins as is well known in heat exchanger technology. Such a continuous helical fin may be united to the tube in accordance with the instant invention.

While, as is most often the case, the fins are perpendicular to the tube, of course, this is not essential. They may be aligned outside the perpendicular and still be firmly united to the tube.

Furthermore, the fins may be other than flat units. They may be contoured or bent as may be suitable for particular application.

While water is used as an expansive fluid in the examples, clearly other liquids may be employed. Water has the advantage of being inexpensive and readily available, but as the need appears other liquids may be substituted. For example, a greater or lesser amount of expansion, a different freezing temperature, or a less corrosive fluid may be desired.

Figure 7:
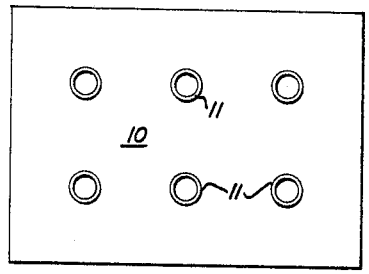
Figure 8:
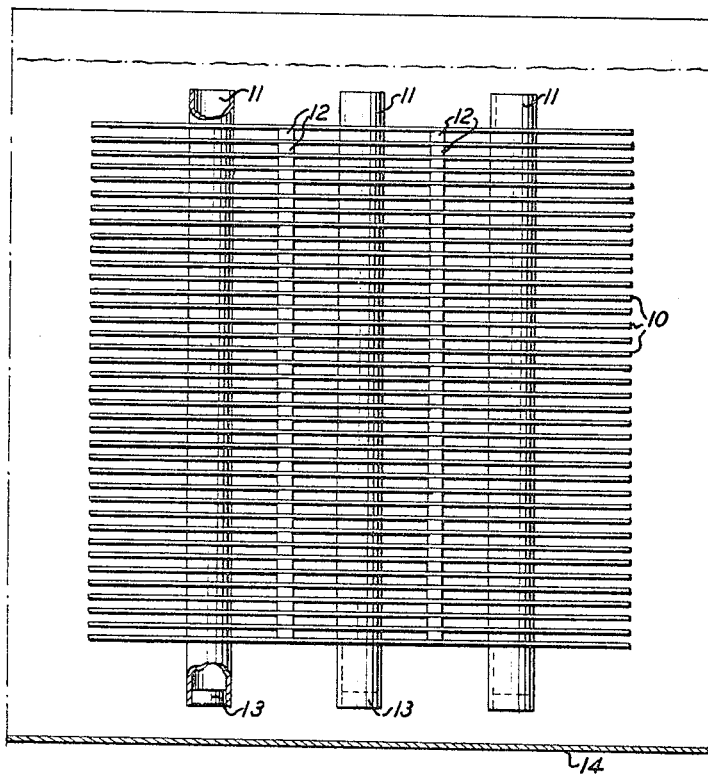

FIGURES 7 and 8 indicate a specific embodiment of the invention. FIGURE 7 shows a side view of a typical condenser, and FIGURE 8 shows the immersion of the condenser in a tank wherein the freezing takes place.

The simplicity of the above figures makes a prolonged description unnecessary. Numeral 1 on each of the figures indicates the fin, numeral 2 indicates the thin-walled tube, and numeral 3 indicates the tube sheet.

Figure 1:
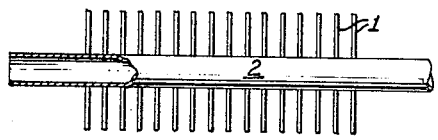
FIGURE 1 illustrates a partial longitudinal cross section of a single tube surrounded by a plurality of fins as conventionally employed in a radiation heater.
Figure 1:
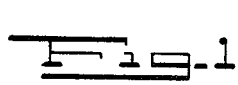
Figure 2:
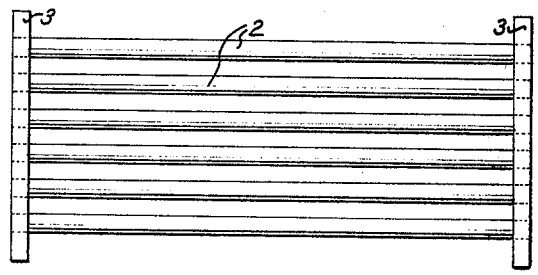
FIGURE 2 is a reactor having a plurality of tubes affixed to two tube sheets.
Figure 3:
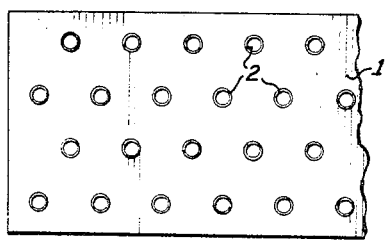
FIGURES 3 and 4 represent a side and front view of a condenser wherein a plurality of fins are united to a plurality of tubes.
Figure 3:
Figure 4:
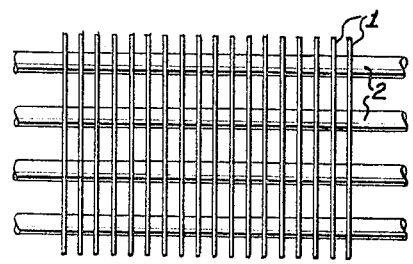
Figure 4:
Figure 5:
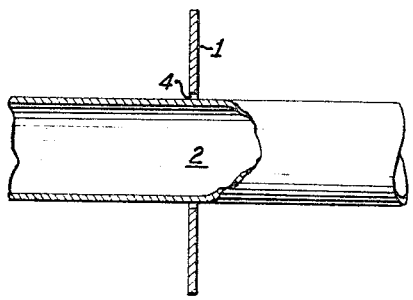
FIGURE 5 illustrates an enlarged view of the fin and tube, prior to expansion in accordance with the invention.
Figure 5:
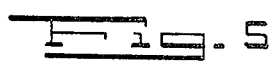
Figure 6:
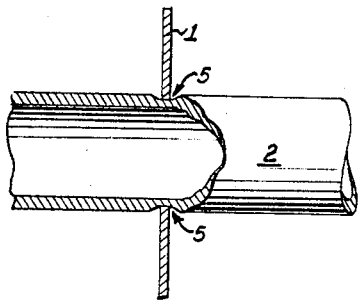
FIGURE 6 is an enlarged view of a fin end tube after the tube has been expanded in accordance with the invention.

Turning to FIGURE 5, it will be noted that there is a slight tolerance 4 between the fin and outside tube wall. The determination of the amount of this tolerance is an important aspect of the invention. As a practical matter, the greater the tolerance between the diameter of the tube and the diameter of the hole, the more easily the apparatus can be assembled. This is particularly important in the case of devices employing a large number of tubes and fins. Of course, it is apparent that the tolerance must not be so great that the tube, after expansion, will not be brought into contact with the fin. In determining the appropriate tolerance, several factors must be considered such as the materials of construction, the elastic limit of the tube, the diameter of the tube, the permissible manufacturing tolerance of the tube, and the fluid which is selected for freezing within the tube.

By filling a selected tube with liquid, say, water, and placing it under freezing condition, the maximum amount of tube expansion may be readily determined. Alternatively, this expansion can be closely approximated by calculation. In the case of water, the increase in volume upon freezing is about 8%. Upon freezing, the increase in the outside diameter of the tube, will approach this 8% figure. This expanded diameter governs the maximum amount of tolerance permissible.

In actual practice, the final diameter of the tube is limited by the diameter of the hole, i.e., the tube is prevented from complete expansion. Hence, when the term, "expanded diameter," is used in the following discussion, it refers to the maximum diameter that the tube would achieve in the absence of the fin.

Generally, because wide tolerances are permitted in the manufacture of tubing, it is desirable to make the diameter of the hole in the fin or tube sheet midway between the initial and expanded diameter. However, the hole diameter may be larger than the initial diameter of the tube by as little as 10% of the difference between the expanded and initial tube diameter. Even amounts less than 10% may be satisfactory so long as it is possible to slide the tube through the hole and permit the tube to expand beyond its elastic limit. Of course, if the hole is so small as to prevent the tube from exceeding its elastic limit when the ice is removed, the tube will resume its initial diameter. The maximum diameter of the hole may be only slightly less than the expanded diameter. It is enough that the tube should be permitted to just contact the fin. Generally, the hole diameter may exceed the initial diameter by a maximum of 95% of the difference between the final and expanded tube diameter.

The radial expansion of a large diameter tube is greater than a narrow diameter tube. A wide variety of methods can be used to cool the fluid content within the tube. The entire assembly may be immersed into a cooled temperature liquid such as liquid nitrogen or air. Vaporization techniques may also be effectively employed. A secondary fluid, such as brine or alcohol, may be circulated about the apparatus to bring about the freezing.

The instant invention makes possible the construction of apparatus which could not be constructed at all or only with great expense and difficulty by the techniques of the prior art. In condensers where it is necessary to have a multiplicity of tubes and many very closely spaced tube sheets, it is impossible to use welding or expanding equipment. The spaces between the sheets may be so small that the welding torch cannot be positioned properly for heating the juncture. Similarly, very small diameter tubing cannot be satisfactorily united by using conventional rolling equipment.

Another great advantage of the instant invention is that it may be readily adapted to continuous assembly line techniques. The tube sheets and the tubes may be assembled at a first station, the tubes filled with water, and finally, the water frozen therein. A conventional conveyor bath may readily function to move the assembly from the cooling station to the freezing bath.

When a plurality of fins are placed over one or more tubes, it is advantageous to use spacers to permit the rapid stacking of the fins the appropriate distance apart. These spacers may be simply washers of a predetermined thickness which are alternately placed on the tubes with the fins. Other convenient spacing techniques are obvious to those skilled in the art. For example, the fins may contain projections which abut against the adjacent fin to maintain proper spacing.

To more fully illustrate the invention, attention is directed to the following example:

*Example*

FIGURES 7 and 8 show a specific application of the invention. Fins 10, which are 12 x 15" and 0.03" thick, are perforated with a series of holes 1.517" in diameter, equally spaced spaced 4½" between center. Six twelve-gauge 1½" O.D. steel tubes 11 having an actual outside diameter varying between 1.499 and 1.501 are assembled with a plurality of the fins 10 as illustrated in the drawing. Spacers 12 maintain the fins about ¼" apart. One end of each of the tubes is capped by rubber caps 13. The entire assembly, with the tubes in vertical alignment and the closed end down, is placed in a large tank 14. The tubes 11 are each filled to the top with water. They are left open. Sufficient liquid nitrogen is added to the container to cover the assembly and in twenty minutes the water in tubes was frozen solid. An hour later the temperature in the container was 5° F. and the unit removed from the container. Close examination of the unit revealed that each and every fin was rigidly united to the expanded tubes. The tube sheets were intact with no evidence of disproportionate stress.

In view of the foregoing disclosures, variations and modifications thereof will be apparent to one skilled in the art, and it is intended to include within the invention all such variations and modifications except as do not come within the scope of the appended claims.

What is claimed is:
1. A method of uniting the external surface of a thin-walled hollow tube to the inside edge of a sheet which defines a hole which comprises: positioning said tube within said hole, and freezing a liquid contained in said tube so as to expand said external surface of said tube into contact with the inside edge of said sheet.

2. A method of forming a finned tube by uniting a series of fins, each defining a hole slightly larger than the outside diameter of said tube, which comprises: positioning said tube within the hole defined by said fins, so that the fins lie in substantiallly parallel relationship to one another and perpendicular to said tube; and freezing a fluid in said tube, thereby expanding the outside diameter of said tube to at least the diameter of said hole, so as to form a rigid bond between said tube and said fins.

3. The method of claim 2 wherein said fluid is water.

4. The method of claim 2 wherein the freezing is effected by immersion in a sub-freezing bath.

5. The method of claim 2 wherein the fins are maintained in alignment by spacer means.

6. A method for uniting a tube sheet which defines a plurality of holes to a plurality of tubes having an initial outside diameter slightly less than said holes which comprises: inserting said tubes into said holes, sealing at least one end of said tubes, and freezing a fluid in said tube so as to expand the external surface of said tubes into rigid contact with said tube sheet.

References Cited

UNITED STATES PATENTS

| | | | |
|---|---|---|---|
| 2,281,207 | 4/1942 | Schoen | 29—157.3 |
| 2,948,054 | 8/1960 | Kritzer | 29—157.3 |
| 3,183,970 | 5/1965 | Worley | 165—181 |
| 3,189,087 | 6/1965 | Parris | 165—181 |
| 2,754,573 | 1/1956 | Schoessow | 29—523 X |
| 2,841,866 | 7/1958 | Schilling | 29—423 |
| 2,944,338 | 7/1960 | Craig | 29—423 |
| 3,007,237 | 11/1961 | Woodruff | 29—157.3 |
| 3,131,467 | 5/1964 | Thaller | 29—421 |
| 3,343,250 | 9/1967 | Berto et al. | 29—423 |

JOHN F. CAMPBELL, *Primary Examiner.*

P. M. COHEN, *Assistant Examiner.*

U.S. Cl. X.R.

29—423